United States Patent Office 2,859,095
Patented Nov. 4, 1958

2,859,095

PROCESS OF PRODUCING $Cm^{244}$ AND $Cm^{245}$

Winston M. Manning and Martin H. Studier, Downers Grove, Herbert Diamond, Western Springs, and Paul R. Fields, Chicago, Ill., assignors to the United States of America as represented by the United States Atomic Energy Commission No Drawing. Application September 27, 1957
Serial No. 686,802

3 Claims. (Cl. 23—14.5)

This invention deals with a method of making curium isotopes having mass numbers 244 and 245 and mixtures thereof. It includes a process of producing energy and a method of preparing a material for this purpose.

Curium isotopes of atomic masses between 240 and 242 have been produced heretofore, and their production forms the subject matter of copending application Serial No. 75,064, filed by Glenn T. Seaborg on February 7, 1949.

It is an object of this invention to provide curium isotopes suitable as fuel material for nuclear reactors.

It is another object of this invention to provide a process for the production of curium fertile material and curium thermal-neutron-fissionable material.

It is also an object of this invention to provide a novel method of producing energy.

These objects of the invention are best accomplished by exposing $Pu^{239}$ to a high neutron flux, for instance, to a flux of at least $10^{14}$ neutrons/cm.$^2$/sec. for a time to obtain an integrated flux in the order of $10^{21}$ neutrons/cm.$^2$. The irradiated mass is then dissolved and converted to a hydrochloric acid solution of the elements, the remaining plutonium is oxidized to at least its tetravalent state, and the solution is passed through an anion exchange resin whereby the plutonium is absorbed while the fission products and transplutonium values pass through the resin in the effluent. This effluent is converted to a dilute hydrochloric acid solution and flowed through a cation exchange resin whereby the transplutonium values are absorbed while some of the fission products remain in the aqueous solution leaving the resin. The cation exchange resin is then washed with dilute hydrochloric acid whereby some fission products, but not the curium are removed. The curium is then eluted with concentrated hydrochloric acid, and the eluate thus obtained is further purified by repetition of the above steps. The curium is then precipitated on a lanthanum fluoride carrier. The precipitate is dissolved in dilute hydrochloric acid, and the solution formed thereby is passed through a cation exchange column. An aqueous citrate solution preferably obtained by neutralizing an aqueous 5 percent citric acid with ammonia to a pH value of 3.3 is then passed through the column whereby the transplutonium values are eluted; the eluate is collected fractionally and the transplutonium values, which are eluted in the order of decreasing atomic and mass numbers, are thereby separated.

All anion and cation exchange resins, respectively, are satisfactory for the process of this invention, such as carboxylic and sulfonic type, strongly or weakly basic, resins. For instance, anion exchange resins made according to U. S. Patents No. 2,356,151; No. 2,402,384; No. 2,591,573; No. 2,578,937; No. 2,559,529; No. 2,614,099; No. 2,285,750 and No. 2,469,683 and cation exchange resins made according to U. S. Patent No. 2,366,007 were found to be suitable.

These steps are the essence of the separation process to be used for the neutron-bombarded plutonium, but additional intermediate procedures or steps may be used for the purpose of obtaining a higher degree of separation and purification as will be obvious from the example given below. For instance, various precipitation-dissolution cycles may be inserted, such as precipitation of the plutonium-contaminated transplutonium values on lanthanum fluoride and/or precipitation of these values as the hydroxides.

While $Pu^{239}$ can be neutron-bombarded in any form, namely in the form of the element, in the form of a compound, or in the form of an alloy, the use of plutonium as an alloy with aluminum was preferred. The alloy is preferably encased in an aluminum sheath for protective purposes. In this instance, dissolution of the irradiated body is first carried out with an aqueous sodium hydroxide-sodium nitrate solution whereby the bulk of the aluminum is dissolved while hydroxides of the plutonium and of the values formed by the neutron bombardment remain as a precipitate. This dissolving reaction may be initiated by heating; thereafter it is advantageously controlled by cooling the reaction vessel. The hydroxide precipitate is then separated from the aluminate solution, for instance by centrifuging or any other means known to those skilled in the art, and then dissolved in hydrochloric acid.

When $Pu^{239}$ or $Pu^{239}$-containing material is bombarded with neutrons, it is consecutively converted by a series of n, $\gamma$-chain reactions to $Pu^{240}$, $Pu^{241}$, $Pu^{242}$, $Pu^{243}$, $Pu^{244}$, and $Pu^{245}$. $Pu^{243}$ and $Pu^{245}$ $\beta$-decay to $Am^{243}$ and $Am^{245}$, respectively. The $Am^{243}$, when neutron-bombarded, is converted to the $Am^{244}$ which in turn $\beta$-decays to $Cm^{244}$. Americium$^{244}$ also forms $Pu^{244}$ by electron capture. $Am^{245}$ $\beta$-decays to $Cm^{245}$. The $Cm^{244}$, in the neutron flux, is then converted to $Cm^{245}$, and $Cm^{245}$ is converted consecutively to $Cm^{246}$, $Cm^{247}$, $Cm^{248}$, $Cm^{249}$, $Cm^{250}$, and probably $Cm^{251}$ and $Cm^{252}$. $Cm^{249}$, $Cm^{251}$ and $Cm^{252}$ were found to $\beta$-decay and to form the berkelium isotopes of the corresponding mass numbers. $Bk^{249}$ is converted by neutrons to $Bk^{250}$, $Bk^{250}$ to $Bk^{251}$ and $Bk^{251}$ to $Bk^{252}$. All four berkelium isotopes $\beta$-decay and thereby form the corresponding californium isotopes; each californium isotope, when bombarded by neutrons, is converted to the next higher californium istotope. By this, californium isotopes from mass number 250 through 254 are formed. Among these the isotopes $Cf^{250}$ and $Cf^{252}$ are spontaneously fissionable. $Cf^{253}$ $\beta$-decays and thereby forms element 99 and, more specifically, the isotope of 99 that has the mass number 253. Isotope $99^{253}$, by neutron bombardment, is converted to $99^{254}$ and the latter to $99^{255}$. $99^{254}$ was found to have a half-life of 37 hours and $99^{255}$ a half-life of 35 days; they $\beta$-decay and thereby form the element 100, namely, isotopes $100^{254}$ and $100^{255}$, which again are converted to $100^{256}$ by the n, $\gamma$-reaction.

The transplutonic elements which have just been described have been synthesized by neutron-irradiation of $Pu^{239}$ and separated from each other. If desired, the berkelium can be isolated from the neutron-irradiated plutonium by dissolving the latter in nitric acid whereby the berkelium is obtained in its tetravalent state and contacting the solution obtained with a dialkyl phosphate, for instance with a heptane solution of di(2-ethyl hexyl) orthophosphoric acid whereby tetravalent actinides and fission products are extracted away from trivalent actinides and fission products. The organic solution is then scrubbed with a solution of a reducing agent, e. g., with a nitric acid solution containing hydrogen peroxide, whereby berkelium and cesium are reduced to their trivalent state and back-extracted away from values of higher valence state. Separation of berkelium from cesium can then be accomplished by selective extraction of the berkelium with tributyl phosphate or di (2-ethyl hexyl) orthophosphoric acid from a hydrochloric acid solution.

They were identified by α-pulse analysis, by mass spectrometry and from a curve plotted as the function of α-activity and degree of elutability from a cation exchange resin with ammonium citrate solution. Such a curve showed a number of very distinct peaks each of which indicated the elution of one of the elements.

Various physical constants of the curium isotopes were determined. For $Cm^{244}$ a half-life of $19.2 \pm 0.6$ years was ascertained, a thermal neutron-capture cross section of $25 \pm 10$ barns and a ratio of spontaneous fission-to α-disintegration of $1:7.25 \times 10^5$. $Cm^{245}$ has a half-life of about $(1.15 \pm 0.5) \times 10^4$ years and a thermal neutron-capture cross section of $200 \pm 100$ barns; it has a thermal-neutron-fission cross section of 1800 barns. $Cm^{246}$ has a half-life of 4000 years and a thermal-neutron-capture cross section of $15 \pm 10$ barns.

$Cm^{245}$, having a considerably higher thermal-neutron-fission cross section than a thermal-neutron-capture cross section and a very long half-life, is highly suitable as a thermal-neutron-fissionable isotope for use in a self-sustaining neutronic reactor for the production of energy or power and/or of fission products having medical and industrial utility. $Cm^{244}$ has a low thermal-neutron-capture cross section, which, however, is still higher than that of $U^{238}$ (2.80). In $U^{238}$ containing small quantities of $Cm^{244}$ the latter will therefore be converted to the fissionable isotope $Cm^{245}$ when neutron-bombarded. For this reason, a neutronic reactor can use a mixture of the two isotopes $Cm^{244}$ (fertile isotope) and $Cm^{245}$ (fissionable isotope), and separation of these two isotopes is not necessary for this use. $Cm^{245}$ can thus substitute for at least part of the $U^{235}$, $U^{233}$, or $Pu^{239}$ in fuel elements of neutronic reactors, and the mixture of $Cm^{244}$ and $Cm^{245}$ can be used in a similar manner with natural or enriched uranium, depending upon the proportion of $Cm^{245}$.

In the following an example is given for the process of this invention by which the various curium isotopes have been produced in concentrated form.

EXAMPLE

Twenty grams of a sheet of a binary aluminum alloy containing 10 percent by weight of $Pu^{239}$ was encased in an aluminum sheath. The sheet was bent in the form of a cylinder which had an outside diameter of 1½ inches and a height of 2 inches. This cylinder was inserted into a neutronic reactor and exposed there to neutrons. The integrated neutron flux was $8 \times 10^{21}$ neutrons/cm.²; the flux $3.1 \pm 0.5 \times 10^{14}$ neutrons/cm.²/sec.; the exposure lasted for about 600 days including various shutdown periods. After this irradiation practically all of the plutonium except about 10 mg. had been burned out.

The neutron-bombarded cylinder was immersed in 250 ml. of an aqueous solution containing 50 grams of sodium hydroxide and 100 grams of sodium nitrate. The aluminum was dissolved thereby; after two-fold dilution and heating of the solution the plutonium as well as the fission product and transplutonium values were precipitated as the hydroxides. The precipitate was removed by centrifuging and then dissolved in 100 ml. of a 10 M aqueous hydrochloric acid to which a trace of nitric acid had been added; the latter was for the purpose of oxidizing the plutonium to at least its tetravalent state.

The anion exchange resin used throughout this example was a resin made according to U. S. Patent No. 2,559,529, column 2, line 36 to column 3, line 22; this patent was granted to William C. Bauman on July 3, 1951. The cation exchange resin used was one prepared in accordance with Example 1 of U. S. Patent No. 2,366,007 granted to Gaetano F. d'Alelio on December 26, 1944.

The hydrochloric acid solution was passed through an anion exchange resin column 1 foot high and 2 inches in diameter. The resin was then washed with 300 ml. of a hydrochloric acid-nitric acid mixture which had the same composition as that used for dissolution of the hydroxide precipitate.

The two effluents, that obtained by passing the hydrochloric acid solution through the column and that obtained after washing the resin with the hydrochloric acid-nitric acid mixture, were combined and evaporated to near-dryness. 15 ml. of a 1 M hydrochloric acid was then added, and the solution thus obtained was passed through a cation exchange resin that was in the form of a column 2 feet high and 1½ inches in diameter. The resin was then washed with 300 ml. of a 1 M hydrochloric acid. The effluent obtained during absorption and that obtained during this last-mentioned washing step contained some of the fission products.

The transplutonium elements and the trace of residual plutonium were then eluted from the cation exchange resin by passing 175 ml. of an 11.8 M hydrochloric acid therethrough. The effluent coming off the column by this was collected in 20-ml. fractions, and those fractions showing a high alpha-activity were then combined. The fractions having low or no alpha-activity mainly contained fission products. The alpha-active part of the effluent was then evaporated to a volume of about 3 ml., and water was added thereto in a quantity to obtain a total volume of 20 ml.

Lanthanum nitrate was then added to the solution in a quantity of 2 mg. and thereafter a 1 M hydrofluoric acid solution whereby the lanthanum was precipitated as lanthanum fluoride; this precipitate carried practically all of the plutonium and transplutonium values. It was separated from the solution by centrifuging and washed with 8 ml. of an aqueous solution 1 M in nitric acid and 0.1 M in hydrofluoric acid and thereafter with 4 ml. of 1 M nitric acid alone.

The washed precipitate was then dissolved in 2 ml. of an 8 M nitric acid that was saturated with boric acid; after this, water was added to double the volume of the solution. Diluted ammonium hydroxide was then added to the solution until the latter was neutral and an additional 10% of the quantity needed for neutralization was present. This caused the formation of a hydroxide precipitate; the precipitate was separated from the liquid by centrifuging, washed with water and dissolved in 10 ml. of an 11.8 M hydrochloric acid that contained a trace of nitric acid.

The solution thus obtained was passed through an anion exchange resin column 3 inches high and ½ inch wide. Through the column there were then passed 25 ml. of an 11.8 M hydrochloric acid which contained a trace of nitric acid whereby the alpha-activity was washed off the column. The two effluents, that obtained during absorption and that obtained during washing, were combined and evaporated to near-dryness. The evaporation residue was then diluted with 20 ml. of water, and an excess of diluted ammonium hydroxide was added whereby the transplutonium elements were precipitated in the form of their hydroxides. This precipitate was washed with water.

The washed precipitate was dissolved in 0.350 ml. of 0.5 M perchloric acid, and the solution obtained thereby was passed through a cation exchange resin column 20 cm. high and 4 mm. in diameter. The column container was provided with a jacket through which trichloroethylene vapors were passed to heat the column to 87° C. The effluent coming off the column was discarded. The column was then washed with an ammonium citrate solution prepared by adjusting the pH of an aqueous 0.25 M citric acid solution to a value of 3.30 with ammonia gas. The effluent was collected in fractions of one drop each, and each drop was analyzed by alpha-pulse analysis and mass spectrometry.

The total yield of curium fractions was $1.6 \times 10^{11}$ alpha-counts, and the distribution of the various isotopes was $1.84 \pm 0.04\%$ for $Cm^{242}$, $95.51 \pm 0.07\%$ for $Cm^{244}$, 1.27±0.04% for $Cm^{245}$, 1.36±0.04% for $Cm^{246}$, 0.016±0.002% for $Cm^{247}$, <0.002% for $Cm^{249}$ and <0.002% for $Cm^{250}$. The abundance of $Cm^{248}$ ions could not be determined on account of interference of the impurity $ThO^+$ of the mass number 248.

As has been mentioned before, material of this composition is suitable as fuel in a nuclear reactor to replace natural uranium. Material containing an enriched proportion (obtained by known processes for separating neutron-bombarded $Pu^{239}$) of the thermal-neutron-fissionable $Cm^{245}$ is superior to both, $U^{235}$ and plutonium, as a nuclear fuel.

The important characteristics for this purpose are the thermal-neutron-fission cross section and the thermal-neutron-capture cross section of the isotope or isotopic mixture.

If the ratio of the thermal-neutron-fission cross section to the thermal-neutron-capture cross section is large enough, the number, $\eta$, of neutrons produced and released by fission per each thermal neutron absorbed in the fuel material is greater than unity and a chain reaction is possible.

The calculation of $\eta$, when the characteristics mentioned above are known, is described in Glasstone and Edlund, the Elements of Nuclear Reactor Theory, Van Nostrand, 1952, chapter 4, and especially on page 83, in equation 4.57.1. By this equation it is possible to calculate the value of $\eta$ for any mixture of curium isotopes.

In the following calculation the isotopes $Cm^{242}$, $Cm^{246}$, and higher isotopes have been neglected because they have comparatively small macroscopic absorption cross sections, and also because they are present in a small proportion only in the isotopic mixture obtained by the irradiation process described. The number, $\nu$, of neutrons produced per curium fission, extrapolating from present known data of other heavy elements, should be at least 3. According to the calculation referred to above $$\eta = \frac{\Sigma_{f(245)} \times \nu}{\Sigma_{f(245)} + \Sigma_{c(245)} + \Sigma_{a(244)}}$$

$$= \frac{N_{245} \times \sigma_{f(245)} \times \nu}{N_{245}[\sigma_{f(245)} + \sigma_{c(245)}] + N_{244}\sigma_{a(244)}}$$

$$= \frac{\sigma_{f(245)} \times \nu}{\sigma_{f(245)} + \sigma_{c(245)} + \frac{N_{244}}{N_{245}}\sigma_{a(244)}}$$

wherein $\Sigma_f$, $\Sigma_c$, $\Sigma_a$, are the macroscopic cross sections for fission, capture and absorption reactions, respectively, (see Glasstone, Section 3.42), while $\sigma_f$, $\sigma_c$, and $\sigma_a$ are the respective microscopic cross sections; the latter are given above. (The absorption cross section is the sum of fission and capture cross sections.) The letter $N$ in the equations is the number of atoms per cc., so that the ratio of $N$ values is the atomic ratio, and in the specific case of curium 244 and curium 245, very nearly the ratio of the weight percentages because the atomic weights are proportionally so similar. This ratio $$\frac{N_{244}}{N_{245}} = \frac{95.5}{1.27} = 75.2$$

Therefore $$\eta = \frac{1800 \times 3}{1800 + 200 + 75.2(25)}$$
$$= 1.39$$

For natural uranium the corresponding value is 1.32 (see for example Murray, Nuclear Reactor Principles, Prentice-Hall, 1954, page 106).

Thus the curium isotope mixture obtained in the example behaves, when used as a nuclear fuel, in about the same way as natural uranium. If the Cm isotopes 244 and 245 are still further separated, a higher value for $\eta$, the ratio of neutrons formed by fission: neutrons absorbed, is obtained.

An example of a reactor is described in U. S. Patent No. 2,708,656 granted to Fermi and Szilard on May 17, 1955. See the "Illustrative Gas Cooled Neutronic Reactor," columns 37–42, which deals with the Clinton pile or Oak Ridge Graphite Reactor. This reactor has also been described in less detail in unclassified publications such as Nucleonics, February 1952. A suitable fuel element for such a reactor using the invention contains curium with an isotopic composition of at least 1.25 percent by weight of $Cm^{245}$ and at least 95.5 percent by weight of $Cm^{244}$. It is preferably used in the form of metal cylinders 1.1 inches in diameter and 4 inches long which are covered with an about 20-mil thick aluminum jacket so that good heat-conductivity with the curium is obtained.

The curium mixture obtained by irradiation and separation, as described, can be readily enriched in the fissionable isotope $Cm^{245}$ by electromagnetic separation in the calutron known to those skilled in the art. Because of the high fission-to-capture-cross-section ratio the efficiency of the isotopic mixture as a fuel rises much more rapidly with enrichment in $Cm^{245}$ than is the case for a uranium isotopic mixture with increasing enrichment in $U^{233}$ or $U^{235}$. For example, a mixture of curium isotopes containing 50% $Cm^{244}$ and 50% $Cm^{245}$ gives a value of at least 2.67 for $\eta$; a thermal so-called breeder reactor, in which more fissionable material is produced than consumed, can be readily constructed of such fuel.

Such an enriched curium material can also be used to increase the K factor (neutron reproduction factor) in a portion of the lattice of a heterogeneous reactor, in order to compensate for the decreased K factor in other portions of the reactor because of fuel depletion, build-up of poisons, etc., and thereby to maintain the over-all K factor at a level greater than unity. Such enriched curium material can also be used in annular zones near the periphery of the reactor core to build up or "flatten" the neutron flux distribution and increase the over-all power capability. Other similar uses for such a material will be readily suggested to a person skilled in the art. This increase of the K factor in a portion of a reactor is also described in the above-cited Fermi et al. patent in columns 44–48.

Another embodiment of the present invention is concerned with the production of californium isotopes which have a high rate of spontaneous fission.

An object of this embodiment is the production of a particularly desirable type of neutron source.

It has been found in accord with this invention that certain californium isotopes are produced by the irradiation of $Pu^{239}$ with neutrons of thermal energy in a high-flux level for a suitable period of time. The flux level must be at least about $10^{14}$ neutrons/cm.²/sec.

Not only must the flux level or neutron irradiation be high, but the plutonium must be maintained in the flux for a considerable time to achieve a high integrated flux. While microscopic amounts of the californium isotopes of interest can be produced by an integrated flux as low as $4 \times 10^{21}$ neutrons/cm.², in order to obtain useful amounts of $Cf^{252}$ and $Cf^{254}$, the $Pu^{239}$ must be exposed to an integrated neutron flux of at least $10^{22}$ to $10^{23}$ neutrons/cm.²

By the foregoing method californium isotopes of mass numbers 249, 250, 251, 252, 253, and 254 are produced. The present invention however is particularly concerned with the production of the californium isotopes of mass numbers 252 and 254. While all of the isotopes of californium, namely 249, 250, 251, 252, 253, and 254 which are produced by the method of the present invention do spontaneously fission, the half-lives for spontaneous fission of the californium isotopes, except for 252 and 254, are relatively long, so that their usefulness as neutron producers are limited. $Cf^{252}$ and $Cf^{254}$ have short spontaneous fission half-lives of 60 years and 55 days, respectively, so that these isotopes are especially suitable for use in neutron sources. Californium 252 in particular can be produced by the above methods in relatively large quantities.

All of the californium isotopes produced by the irradiation of $Pu^{239}$ can be separated together from the other transuranic isotopes by the methods previously described in the present application. The californium isotopes of particular interest may then be separated from the other californium isotopes by mass-spectrographic methods, thermal-diffusion methods, and other methods of separating isotopes, all of which are well known in the art.

The separated isotopes may be fabricated into a neutron source by incorporating a suitable compound of californium containing spontaneously fissionable isotopes, such as the oxide or a halide, into a suitable capsule; the capsule material should be sufficiently dense and have a high enough tensile strength to contain the fission products produced, but should have a low cross section for neutron capture. Zirconium and aluminum are particularly suitable container materials. The californium neutron sources can be produced in any size from the very tiny sources suitable for use in therapeutic irradiations to the very large neutron sources, which can suitably be used to replace many of the functions of the conventional nuclear reactor.

Another neutron source utilizes the alpha particles of californium$^{252}$ by immersing it in heavy water with which they react by the $\alpha$, n reaction. If enough californium is used, the flux can be built up to $1 \times 10^{10}$ neutrons/cm.$^2$/sec. A mixture of curium$^{244}$ and beryllium can also be used for this purpose.

Californium$^{252}$ is furthermore useful as the radioactive source in atomic batteries like that described in Chemical and Engineering News, 32, 592 (1954). A base member of a germanium-antimony or a silicon-antimony alloy with a surface layer of californium$^{252}$ has been found satisfactory for this purpose.

Californium$^{252}$ also can be added to the fuel material of a neutronic reactor to increase its K-factor, for instance, to a reactor that has a K-factor of about 1.001. The use of californium$^{252}$ in a homogeneous reactor can make it self-controllable; the expansion of the water is used to shut the reactor off.

Californium$^{252}$ is also useful as a point source of neutrons in exponential measurements of reactivity of reactor lattices. The mathematics is much simplified by the fact that californium$^{252}$ can be used in a small amount approximating a point. The californium$^{252}$ in the form of a sphere of viz. 1 mm. diameter encased in zirconium is used as the point source.

The nuclear properties of the various californium isotopes produced by the present method are shown in the following table.

Table

| Isotope | Radiation | Half-life | Energy | Spontaneous fission half-life |
| --- | --- | --- | --- | --- |
| Cf$^{249}$ | $\alpha$ | 550±150 yrs. | 5.4 ±0.1 | 10$^8$ years. |
| Cf$^{250}$ | $\alpha$ | 9.4±2.3 yrs. | 6.03±0.01 | 10$^4$ years. |
| Cf$^{252}$ | $\alpha$ | 2.1±0.4 yrs. | 6.12±0.01 | 60±12 years. |
| Cf$^{253}$ | $\beta$ | 18±3 days. | | |
| Cf$^{254}$ | (¹) | | | 55±10 days. |

¹ No radiation other than that produced by spontaneous fission has been detected.

It will be understood that this invention is not to be limited to the details given herein but that it may be modified within the scope of the appended claims.

This application is a continuation-in-part of our copending application Serial No. 494,580, filed on March 15, 1955, now abandoned.

What is claimed is:

1. A process of producing Cm$^{244}$ and Cm$^{245}$ comprising bombarding Pu$^{239}$-containing material with neutrons of thermal energy and a flux of at least 10$^{14}$ neutrons/cm.$^2$/sec. for a time sufficient to obtain an integrated flux of at least 10$^{21}$ neutrons/cm.$^2$, dissolving the bombarded material in hydrochloric acid, oxidizing the plutonium to at least its tetravalent state, flowing the solution through an anion exchange resin whereby said plutonium values are adsorbed while the fission products and transplutonium elements formed remain in the aqueous solution leaving said resin as effluent, contacting said effluent with a cation exchange resin whereby said values of the transplutonium elements are adsorbed while said fission product values remain in the aqueous solution leaving the resin, contacting the cation exchange resin with an aqueous citrate solution whereby said transplutonium elements are eluted in the order of decreasing atomic weight, and collecting said transplutonium-containing citrate eluates fractionally.

2. A process of producing Cm$^{244}$ and Cm$^{245}$ comprising encasing a Pu$^{239}$-containing aluminum alloy in aluminum, bombarding said alloy with neutrons of thermal energy and a flux of at least 10$^{14}$ neutrons/cm.$^2$/sec. for a time sufficient to obtain an integrated flux of at least 10$^{21}$ neutrons/cm.$^2$, immersing the alloy in a sodium hydroxide- and sodium nitrate-containing aqueous solution whereby the aluminum is dissolved, adding sodium hydroxide to said solution whereby the plutonium, fission products and transplutonium elements are precipitated as the hydroxides, separating the precipitate from the solution, dissolving the precipitate in hydrochloric acid, oxidizing the plutonium to at least its tetravalent state, flowing the solution through an anion exchange resin whereby said plutonium values are adsorbed while the fission products and transplutonium elements formed remain in the aqueous solution leaving said resin as effluent, contacting said effluent with a cation exchange resin whereby said values of the transplutonium elements are adsorbed while said fission product values remain in the aqueous solution leaving the resin, contacting the cation exchange resin with an aquous citrate solution whereby said transplutonium elements are eluted in the order of decreasing atomic weight, and collecting said transplutonium-containing citrate eluates fractionally.

3. The process of claim 2 in which the alloy contains about 10% Pu$^{239}$ and 90% Al.

References Cited in the file of this patent

UNITED STATES PATENTS

| 2,698,290 | Seaborg et al. | Dec. 28, 1954 |
| 2,711,362 | Street | June 21, 1955 |

OTHER REFERENCES

Proceedings of the International Conference on the Peaceful Uses of Atomic Energy, United Nations, N. Y., vol. 7, Library date Apr. 12, 1956; pages 113–119.